(12) United States Patent
Brennan et al.

(10) Patent No.: US 6,399,693 B1
(45) Date of Patent: Jun. 4, 2002

(54) BIOACTIVE COMPOSITES COMPRISING SILANE FUNCTIONALIZED POLYARYL POLYMERS

(75) Inventors: Anthony B. Brennan, Gainesville, FL (US); Michael P. Zamora, Baton Rouge, LA (US); Rodrigo L. Orefice, Belo Horizonte (BR)

(73) Assignee: Univ. of Florida Research Foundation, Gainesville, FL (US)

( * ) Notice: Subject to any disclaimer, the term of this patent is extended or adjusted under 35 U.S.C. 154(b) by 0 days.

(21) Appl. No.: 09/529,927
(22) PCT Filed: Oct. 23, 1998
(86) PCT No.: PCT/US98/22374
§ 371 (c)(1), (2), (4) Date: Jul. 6, 2000
(87) PCT Pub. No.: WO99/20692
PCT Pub. Date: Apr. 29, 1999

Related U.S. Application Data
(60) Provisional application No. 60/062,701, filed on Oct. 23, 1997.

(51) Int. Cl.[7] .................................................. C08K 3/40
(52) U.S. Cl. .................................. 524/494; 524/10
(58) Field of Search ........................... 524/537, 494, 524/10

(56) References Cited

U.S. PATENT DOCUMENTS

| | | | | |
|---|---|---|---|---|
| 4,183,874 A | | 1/1980 | Fan et al. ................ | 525/100 |
| 4,551,156 A | | 11/1985 | Li ............................ | 55/16 |
| 4,783,504 A | * | 11/1988 | St. Clair ................... | 525/72 |
| 5,162,445 A | * | 11/1992 | Powers ..................... | 525/333.4 |
| 5,246,782 A | * | 9/1993 | Kennedy ................... | 428/421 |
| 5,262,461 A | | 11/1993 | Serizawa et al. .......... | 524/262 |
| 5,606,000 A | | 2/1997 | Jadhav et al. ............. | 528/29 |

* cited by examiner

*Primary Examiner*—Paul R. Michl
(74) *Attorney, Agent, or Firm*—Saliwanchik, Lloyd & Saliwanchik

(57) ABSTRACT

A composite material comprising a mixture of a silane functionalized polyaromatic polymer and an organic or inorganic material containing moieties reactive with the silane groups to provide a covalent bond therebetween.

115 Claims, 10 Drawing Sheets

APS = Amino propyl ethoxysilane
SPSF = sulfonated polysulfone

BIOACTIVE COMPOSITES COMPRISING SILANE FUNCTIONALIZED POLYARYL POLYMERS

RELATED APPLICATIONS

This Application is a 371 of PCT/US98/22374 filed Oct. 23, 1998 which claims benefit of Provisional Application Ser. No. 60/062,701 filed Oct. 23, 1997.

The present application contains subject matter disclosed in and/or related to that of copending patent application Ser. No. 09/529,924 filed concurrently herewith entitled "Silane Functionalized Polyaromatic Polymers and Methods for their Production." The entire contents and disclosure thereof are specifically incorporated herein by reference.

Research leading to the completion and reduction to practice of the invention was supported in part by AFOSR Grant No. F4Q620-95-1-0382 issued by the Department of the Air Force. The United States Government has certain rights in and to the invention claimed herein.

BACKGROUND OF THE INVENTION

1. Field of the Invention

The present invention relates to novel composites of bioactive materials and certain functionalized polyaryl polymers and methods for their preparation, as well as articles of manufacture constructed therefrom.

2. Description of the Prior Art

There has long existed a need for composite or hybrid biomedical articles which combine the structural properties of organic polymers and the biological properties of bioactive inorganic materials. Such materials often take the form of bulk polymers in which are interspersed bioactive particles or fibers. Due to the inherent mutual incompatibility of the great majority of organic polymers and inorganic materials, it has proven extremely difficult to construct composites or hybrids thereof wherein the instability at the interface between the incompatible organic and inorganic phases does not result in highly disadvantageous structural defects in articles constructed therefrom which drastically limit their effectiveness.

Previous efforts to eliminate or reduce this interfacial instability have proven largely unsuccessful. One approach to improving interfacial strength focussed on enhancing wetting of the interfacial surfaces of the incompatible polymers and inorganic fillers. For example, silane coupling agents such as amino triethoxysilane resulted in an increase of the elastic modulus of polymer/glass composites which enabled higher levels of stress transfer through the interface. The overall strength of the composites was also enhanced by using these coupling agents; however, the strain at failure of the thus-treated composites decreased when compared with composites prepared without the coupling agents. This reduction in strain at failure has been interpreted as resulting in a reduction of the toughness of the silane coupled composition.

The interface plays a very important role in the performance of composites. The interface is responsible for transferring stress from the matrix to the fibers/fillers and, therefore, high levels of matrix reinforcement are intimately related to the behavior of the interface as a stress transfer agent. Adhesion between reinforcing agents and matrix is the main interfacial property that should be maximized in order to improve stress transference. Many ways to improve adhesion in polymer composites are currently being investigated, i.e., chemical modification of surfaces such as by the use of the above-described silane coupling agent, and physical modifications such as plasma treatment organic/inorganic composites are polymer-ceramic composites in which the components are combined at the nanometer level. Thus, organic/inorganic composites can have tailorable properties that range within the entire spectrum of properties between ceramics and polymers. organic/inorganic composites as interfacial modifiers are the natural way to reduce both the chemical and mechanical abruptness of the interface in polymer composites reinforced with ceramic fibers. The use of organic/inorganic composites as interfacial modifiers allows the production of an interphase with a gradient of mechanical properties and chemical structure that can improve both chemical interactions and stress transfer. An interphase with a gradient of elastic modulus, for example, minimizes the abruptness of the interface in composites, thereby enabling higher levels of transfer stress than the conventional interface with discontinuous properties thereacross.

Inorganic-organic hybrids have been studied for some time as a way to produce composites with nanophases and diffuse interface. These types of inorganic-organic hybrids are the natural choice for making tailorable interphases in conventional fiber/particle reinforced composites since their structure and composition can be altered to better match the requirements for high levels of adhesion and toughness of the interface. By combining the type of polymer used in the matrix with the nanosized silicate phase, a cross-linked structure that can resemble both the matrix and the reinforcement of the composite can be achieved. In this case, stress transfer can be optimized by breaking the abruptness of the conventional interface in terms of mechanical properties. Thus, the inorganic-organic hybrid, acting as an interfacial agent, would have an elastic modulus between values of the matrix and fiber/particle.

It is an object of the invention to provide novel organic/inorganic composites having greatly enhanced interfacial stability.

SUMMARY OF THE INVENTION

The above and other objects are realized by the present invention, one embodiment of which relates to a composition of matter: a mixture of an inorganic material and an organic material; the organic material comprising a silane functionalized polyaromatic polymer and the inorganic material comprising a network of moieties reactive with the silane groups of the organic material under conditions which do not substantially destabilize the organic and inorganic materials to provide a covalent bond between the moieties and the silane groups.

A further embodiment of the invention concerns the composite formed by reacting the above-described mixture to form a composite comprising the inorganic material covalently bonded to the organic material.

Another embodiment of the invention comprises, as a composition of matter, an organic-inorganic composite comprising a silane functionalized polyaromatic polymer bonded via the silane groups to an inorganic material comprising a network of moieties reactive with the silane groups by a condensation reaction to form covalent bonds therebetween.

Yet another embodiment of the invention relates to a method of forming a composite of an inorganic material and an organic material comprising reacting the above-described mixture to form a composite comprising the inorganic material covalently bonded to the organic material.

An additional embodiment of the invention comprises articles of manufacture constructed of the above-described compositions.

DETAILED DESCRIPTION OF THE INVENTION

Figure 1:
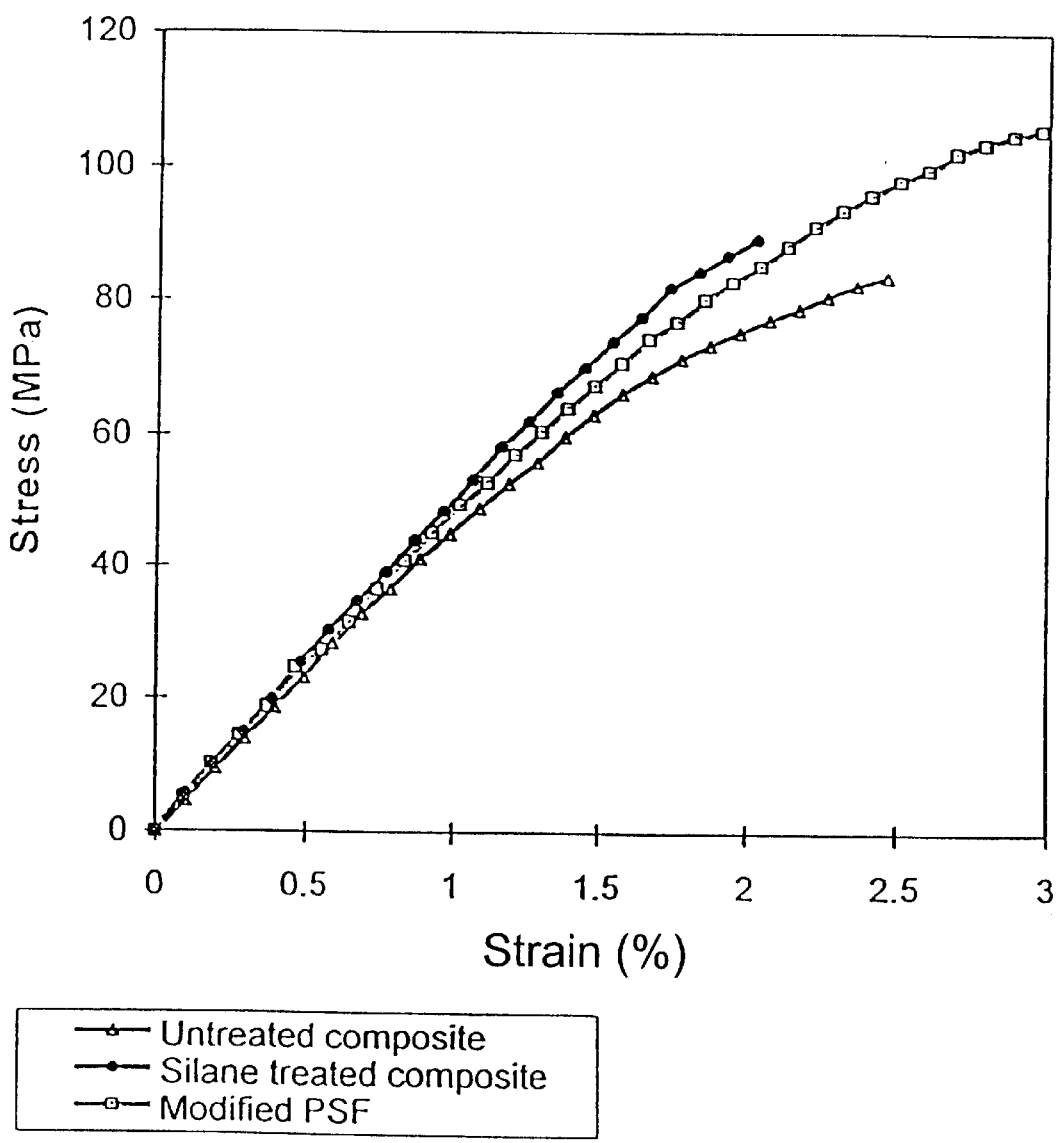
FIGS. 1–10 are graphic representations of various mechanical properties of various composites disclosed and/or claimed herein.

The present invention is predicated on the discovery that the silane functionalized polyaryl polymers described in the above-described copending application Ser. No. 09/529,924 entitled "Silane Functionalized Polyaromatic Polymers and Methods for their Production" (hereinafter referred to as the "application") combine with bioactive inorganic materials to form a covalent bond therebetween, thereby greatly reducing the inherent instability at the polymer/inorganic interface and providing tough composites and hybrids having high interphase strengths.

The silane functionalized polyaryl polymers useful in the practice of the present invention, as well as methods for their production, are described in detail in the application. Briefly, the functionalized polymers are obtained by:

(a) reacting a polyaromatic polymer with a sulfonating agent to introduce sulfonic acid groups on aromatic rings in the polyaromatic polymer, and (b) reacting the product of (a) with a silane terminated coupling agent capable of undergoing a condensation reaction with the sulfonic acid groups thereof to produce a polyaromatic polymer having silane terminated groups on the aromatic rings thereof; the reactions (a) and (b) being conducted under conditions which do not substantially destabilize the polyaromatic polymer.

Any polyaryl polymer containing aromatic rings in the backbone thereof into which reactive sulfonic acid groups can be introduced by reaction with sulfonating agents under conditions which do not destabilize the polymer may be functionalized according to the invention. Exemplary of such polymers are polyarylsulfones, polyarylcarbonates, polyarylethersulfones, polyaryloxides, polyarylethers, polyarylalkenes, polyaryletherketones, polyarylimides, copolymers and/or mixtures thereof. The invention will be illustrated herein employing a polyarylsulfone, specifically polyphenylenesulfone; it being understood that the principles of the invention as described herein are equally applicable to the other polyaryl polymers described above.

The polyaryl polymers may be functionalized first by reaction with any sulfonating agent capable of introducing reactive sulfonic acid or sulfonyl groups into the aromatic rings thereof. Exemplary of such agents are chlorosulfonic acid and the like. Sulfonation may be achieved under conditions which do not destabilize the polymer, but which drive the reaction to completion in a reasonably efficient manner. Generally, the polymer is dissolved in a suitable solvent such as dichloroethane and the like and reacted with the sulfonating agent.

The degree of sulfonation is, of course, dependent upon the molar ratio of sulfonating agent to polymer. Generally, molar ratios of from about 1:1 to about 180:1 of sulfonation agent to polymer are employed; it being understood that the particular ratio employed is dependent upon the degree of sulfonation required for a particular application.

The sulfonated polymers are then reacted with a silane terminated coupling agent under condensation reaction conditions to form the silane functionalized polymers. Suitable silane terminated coupling agents are those having the formula:

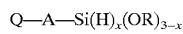

wherein:

Q is a functional group capable of reacting with the sulfonic acid groups of the sulfonated polymer;

A is a non-reactive bridging group between Q and Si;

R is an alkyl or alkenyl group having 1 to 4 carbon atoms; and x is an integer from 0 to 2.

Preferred among the coupling agents of the above formula are those wherein Q is

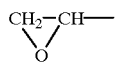

or $NH_2$—; A is alkylene having up to 200 carbon atoms and x is 0; e.g.,

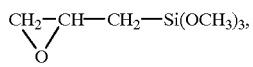

$H_2N$—$(CH_2)_3$—$Si(OCH_3)_3$ and $H_2N$—$C_6H_5$—$Si(OCH_3)_3$. It will be understood by those skilled in the art, however, that any reactive silane terminated coupling agent capable of undergoing a condensation reaction with the reactive sulfonic acid groups of the sulfonated polymer to produce a polyaryl polymer having silane terminated groups in the aromatic rings thereof may be utilized in the practice of the invention herein.

The silane modified aromatic polymers (SMAP) may be combined with a wide variety of materials such as bone, allograft, hydroxyapatite, ceramics, glass, bioactive glass and glass-ceramics. Any material that would reinforce the polymer to change, increase or enhance, e.g., modulus, abrasion resistance, optical density, density, refractive index, etc., may be utilized. The material combined with the SMAP may be any desired form or shape such as, e.g., particulate, fiber. Those skilled in the art will, having been exposed to the principles of the invention described herein, recognize that the material combined with the SMAP may be any material having one or more moieties reactive with the silane groups of the one or more moieties reactive with the silane groups of the SMAP to form covalent bonds therewith. The material must also, of course, be one which does not react with or affect the SMAP in a manner which would undesirably alter the structure or properties thereof. Suitable such moieties include silicate, silica, phosphate, hydrogen phosphate, carbonate, fluorosilicate and the like.

The composite may take the form of a bulk composition suitable for molding or forming; a coating, fiber, membrane or any other shape or form depending upon the end use contemplated.

In a preferred embodiment, the material combined with the SMAP is a bioactive material such as a bioactive glass. The fully reacted composite thereof with a SMAP would be useful for bone splints, prostheses, joint replacements or any application where a combination of high strength and bioactivity are desirable.

The invention is particularly applicable in the area of nanophase composites based upon sol-gel processing. Thus, normally hydrophobic polyaryl polymers may be silane functionalized to render them more hydrophilic such that they can be combined with sol-gel derived bioactive glasses, for example, to produce composites having excellent mechanical properties and bioactivity. Those skilled in the art will be aware that, in addition to conventional sol-gel derived glasses, standard melt processed glasses may also be combined with SMAP's where necessary.

The high degree of interaction between the material and SMAP greatly enhances the stability of the interface therein, thus avoiding macrophase separation. The resulting composites possess excellent mechanical properties compared with conventional composites of polymer and filler and are better suited to processing and forming by a variety of techniques such as casting, thermoforming, injection molding, cutting, shaping, etc.

The composition may be reacted and then formed into the desired shape or first formed or molded and then reacted into a fully cured state. Reaction may be achieved by thermal heating, electromagnetic heating or any other suitable means in the presence or absence of catalysts.

The composites of the invention are useful as stand alone materials, as well as being combinable with other substrate materials to modify the properties thereof.

The invention is illustrated by the following non-limiting examples.

EXAMPLE 1

The sulfonation of polyphenylenesulfone was performed by dissolving a commercially available polymer (Udel® by Amoco) in dichloroethane (10% wt.). Chlorosulfonic acid was added to the solution at room temperature for 30 minutes (molar ratio between chlorosulfonic acid/polysulfonate repeat unit=1) to introduce sulfonic acid groups on the polysulfone.

Thermogravimetric (TG) and Differential Thermal Analysis (DTA) were performed in the modified polymers using a Seiko apparatus. The heating rate chosen was 10°/minute in nitrogen flow of 100 ml/minute. The samples were introduced in a platinum crucible and alumina was used as the reference material. Prior to the analysis, the reference material and crucibles were heated until 1000° C. to eliminate any adsorbed species. The temperature range of analysis was 30° C. to 950° C. The temperature of degradation and drop in weight were compared among the modified polymers and the unmodified one. The drop in weight during a degradation step was used to provide information about the degree of substitution.

The use of FTIR transmission spectra, NMR spectra and thermogravimetric analysis confirmed the introduction of sulfonic acid groups into the aromatic rings of the polysulfone and polycarbonate polymers.

EXAMPLE 2

Sulfonated polysulfones obtained according to the method of Example 1 and having one and two sulfonic acid groups per repeat unit, respectively, were silanated as follows:

1. To a solution of sulfonated polysulfone (SPSF) in DMF (5%), aminopropyltriethyoxysilane was added. The solution was stirred for five minutes and films were cast on glass slides at 60° C. and dried overnight at 160° C. The amount of silane was also varied in order to yield materials with different degrees of silanation. Compositions with one silane group per repeat unit and one silane group every three repeat units were executed. Films having one silane group per repeat unit and two silane groups per repeat unit were prepared.

2. To a solution of sulfonated polysulfone (SPSF) in DMF (5%), glycidoxypropylmethoxysilane (GPS) was added. The solution was stirred for five minutes and water (water/silane molar ratio=3) at pH=1.5 (adjusted by using HNO$_3$) was added and films were cast on glass slides at 60° C. and dried overnight at 160° C. Films having one silane group per repeat unit and two silane groups per repeat unit were produced.

3. To a solution of sulfonated polysulfone (SPSF) in DMF (5%), glycidoxypropylmethoxysilane (GPS) was added.

The solution was stirred for five minutes and TEOS followed by water (water/silane molar ratio=3) at pH=1.5 (adjusted by using HNO$_3$) were added and films were cast on glass slides at 60° C. and dried overnight at 160° C. The final composition of the solution had SPSF/silanes weight ratios equal to 1. Films having one silane group per repeat unit and two silane groups per repeat unit were produced.

The behavior of the solutions, as well as the aspect of the films, were observed visually. The inorganic concentration of the ceramers were checked using TG/DTA.

The cast films were cut and introduced in aluminum pans for DSC analysis. The DSC was conducted in an atmosphere of nitrogen at a heating ratio of 10° C. FTIR and TG analysis confirmed the composition and structure of the modified polymers.

EXAMPLE 3

Aminated polysulfone is produced by reacting the sulfonated polysulfone of Example 1 (dissolved in dimethylformamide) with ethylenediamine, which was added into the reactor in excess (molar ratio between ethylenediamine/polysulfone repeat unit=5). The slurry produced in this manner was vacuum distilled, redissolved in dimethylformamide and precipitated using isopropanol. This results in a —SO$_2$—NH—(CH$_2$)$_2$—NH$_2$ group being introduced into the polysulfone backbone.

EXAMPLE 4

A chloromethylation process was used to introduce —CH$_2$—Cl substituents on polysulfone. The polysulfone of Example 1 was dissolved in dichloroethane and mixed with a solution of chloromethyl octyl ether C$_8$H$_{17}$OCH$_2$Cl in dichloroethane. Thereafter, tin chloride (SnCl$_4$) dissolved in dichloroethane (10 wt. %) was added to the mixture. The reaction proceeded at 55° C. for 8 hours, when the resulting viscous, brownish mixture was coagulated in methanol.

EXAMPLE 5

Bioactive glass disks (1 cm in diameter) were cut and polished with a SiC sand paper #600. The disks were treated with a silane coupling agent (aminopropyl triethoxysilane) for one hour and then introduced into a solution of sulfonated polysulfone in ethanol (5 wt. %) for two hours. Thereafter, the disk was washed several times with ethanol and any non-reacted species were removed by using a Sohlex extractor for 12 hours.

In the case of aminated polysulfone, bioactive glass disks (untreated with silane) were introduced into a solution of aminated polysulfone in dimethylformamide. After two hours, the sample was removed from the solution and washed many times with DMF.

The samples were dried at 90° C. at reduced pressure for 12 hours and analyzed using XPS (Kratos DS800 Mg radiation).

EXAMPLE 6

Grafting Modified Polysulfone on the Surface of Particulate Bioactive Glasses and Manufacture of Composites The sulfonated polysulfone of Example 1 was used in the following grafting technique: bioactive glass particulates (45–38 $\mu$m) were treated with a silane coupling agent (aminopropyl triethoxysilane) for one hour and then introduced into a solution of sulfonated polysulfone in ethanol (5 wt. %) for two hours. The particles were then filtered and washed several times with ethanol. The particles were then again introduced in ethanol to enable the release of any non-reacted species and filtered. The collected grafted particles were dried in vacuum for 12 hours at 120° C.

Polysulfone composites using the grafted particles were produced by dissolving a commercial polysulfone (unreacted, unmodified) in chloroform. To the polysulfone-chloroform solution was added the grafted particles in a loading that would yield 20% volume fraction at the end of the process. The system was agitated for 10 minutes and ethanol was then added to the mixture while mixing to lead to polymer precipitation. The precipitated mixture was dried at 90° C. for two days and at 160° C. (in a vacuum) for 12 hours. The pre-composite was then hot pressed at 215° C. and rectangular samples were cut by using a diamond-saw.

For comparison, polysulfone composites having 20% volume of untreated bioactive glass particles (45–38 $\mu$m) and composites having 20% volume of silane treated bioactive glass particles (45–38 $\mu$m) were also prepared. The processing of these composites imitated the processing steps described for the grafted particulate composite with the exception of the grafting technique.

The volume fraction of particles in the composites was roughly evaluated by measuring the weight of a known volume (rectangular sample) and comparing the density to the theoretical density. The results showed that the densities of the produced composite were within a 1% deviation from the theoretical density and the estimated volume fraction was confirmed.

Flexural mechanical tests were performed by using a four-point bending test apparatus in an Instron machine. ASTM D790M-92 was followed during the tests.

Thermogravimetric (TG) and Differential Thermal Analysis (DTA) were performed in both grafted particles and silane treated particles using a Seiko apparatus. The heating rate chosen was 10°/minute in argon flow of 100 ml/minute.

The samples were introduced in a platinum crucible and alumina was used as the reference material. Prior to the analysis, the reference material and crucibles were heated until 1,000° C. to eliminate any adsorbed species. The temperature range used was 30 to 950° C.

Composites of polysulfone with 20% volume of bioactive glass particles were prepared as described hereinabove. Particles with size ranging from 38 to 45 $\mu$m were used. The following treatments were performed on the particles:

(1) treatment with an amino-propyl triethoxy silane; and (2) treatment with a sulfonated polysulfone. Composites with untreated particles were used as the control.

Dynamic mechanical spectroscopy (DMS) was used to monitor the changes on mechanical properties of composites as a function of temperature and frequency. A DMS 110 rheometer on flexural mode was used with a rate of heating equal to 0.75°/minute and nitrogen atmosphere.

EXAMPLE 7

Modified Polysulfones and Organic/Inorganic Composites as Interfacial Agents in Composites Other modified polysulfones were used as interfacial agents in bioactive glass-polysulfone composites in order to test their ability to reduce chemically the abruptness of the interface.

The aminated polysulfone of Example 3 was used as an interfacial agent in bioactive glass-polysulfone composites. The aminated polysulfone was first grafted onto bioactive glass particles which were incorporated in a pure polysulfone matrix. For the grafting technique, aminated PSF was dissolved in DMF and bioactive glass particulates (45–38 $\mu$m) were added. The mixture was stirred for one hour and the particles were then collected by filtration. The obtained grafted particles were subsequently washed with DMF three times to ensure that no excess of polymer was present. The same procedure was repeated for the chlorinated PSF with the exception that the solvent used in this case was chloroform.

Silanated polysulfone was prepared according to Example 2. Glycidoxypropylmethoxysilane (GPS) was used as the linkage between the polymer and silicate structure. The composition of the hybrids was varied by adding TEOS to the solution.

Inorganic-organic hybrids were used as interfacial agents in bioactive glass-polysulfone composites. They were first grafted onto bioactive glass particles which were incorporated in a pure polysulfone matrix. For the grafting technique, bioactive glass particles were introduced into a solution containing SPSF, TEOS and water in DMF. The mixture was stirred for one hour and the particles were collected by filtration followed by washing with DMF.

The polysulfone composites using the grafted particles were produced by dissolving a commercial polysulfone (unreacted, unmodified) in chloroform. To the polysulfone-chloroform solution was added the grafted particles in a loading that would yield 20% volume fraction at the end of the process. The system was agitated for 10 minutes and ethanol was then added to the mixture while mixing to lead to polymer precipitation. The precipitated mixture was dried at 90° C. for two days and at 160° C. (in a vacuum) for 12 hours. The pre-composite was then hot pressed at 205° C. and rectangular samples were cut by using a diamond-saw.

Flexural mechanical tests were performed by using a four-point bending test apparatus in an Instron machine. ASTM D790M-92 was followed during the tests.

EXAMPLE 8

Grafting Silanated Polysulfone on Glass for AFM Analysis

The sulfonated polymer of Example 1 was reacted with a silane agent according to the procedure of Example 2 in a DMF solution and the amount of silane added was used to tailor the percent of alkoxysilane groups in the polymer. Both aminopropyl triethoxysilane and glycidoxy propyl trimethoxysilane were tested. Thick films of the silanated PSF were cast, yielding transparent films. Polymers with molar ratios polymer/silane equal 1 and 3 were prepared.

Silanated PSF's with different degrees of silanation were grafted onto glass slides by dipping them into a solution (DMF) containing the polymer. The grafted slides were then washed thoroughly with DMF to remove any non-bonded material and observed under AFM (Atomic Force Microscopy) (Tapping® mode) to characterize the surfaces where polymer chains were grafted. The morphologies of tethered chains were identified and correlated to the molecular weight of bulk polymer.

The results of the foregoing examples and tests are as follows:

Modified Polysulfone Grafts in Bioactive Glass

The results of XPS of a bioactive glass disk coated with sulfonated polysulfone and submitted to a Sohlex extraction in ethanol (a semi-quantitative software routine that computes the area under the peaks to verify the amount of each element on the surface of the sample) are exhibited in Table 1 where the theoretical elemental composition of polysulfone and modified ones are compared to the obtained results. From Table 1, it is clear that a large part of the surface is covered with the modified polysulfone. Very few signals coming from elements typically in the glass such as silicon and calcium could be captured. Another important observation from these results is that the theoretical composition of a sulfonated polysulfone (with one sulfone group per repeat unit) is very close to the obtained results. Therefore, it is possible to conclude that:

1. the chemical modification of polysulfone was accomplished; and
2. the new polymer was grafted on the surface of bioactive glass through covalent bonds between the chloride group in the sulfone and amine and/or hydroxyl groups on the surface of the glass and silane layer.

Another spectrum from XPS using the polymer intended to be an aminated polysulfone was analyzed with the results tabulated in Table 1. Some polymer was still present on the surface of the glass after the extraction. On the other hand, the amount of this polymer is really smaller than the case described for the sulfonated polysulfone. This fact is well demonstrated by checking the signals from calcium and silicon (present on the glass surface). Those signals are very clear and strong, showing that the surface is not totally covered by the aminated polymer. Possibly, the amine groups in the modified polysulfone are not completely reacting with the hydroxyl groups on the glass surface and the interactions should basically be based in hydrogen bonds.

TABLE 1

Comparison Between Theoretical and Results from XPS in Terms of Grafting Modified Polysulfone onto Bioactive Glass Surfaces

| Elements | Theoretical PSF (weight %) | Theoretical Sulfonated PSF (weight %) | Grafting SPSF* onto Bioactive Glass (weight %) |
|---|---|---|---|
| C (1s) | 77.1 | 66.9 | 63.0 |
| O (1s) | 15.3 | 19.8 | 23.5 |
| S (2p) | 7.6 | 13.2 | 13.5 |
| N (1s) | — | — | — |
| Ca (2p) | — | — | — |
| Si (2p) | — | — | — |
| P (2p) | — | — | — |

*SPSF = sulfonated polysulfone

Modified Polysulfone Grafts on Bioactive Glass Particulate: TG Analysis

Thermogravimetric (TG) analysis was performed on bioactive glass particles having sulfonated polysulfone grafts on their surfaces. Weight loss curve obtained when bioactive glass particles coated with silane coupling agent was submitted to heating were also plotted (not shown). The particles with the grafts revealed two steps of weight loss, while one can be seen for the silane treated particles. First weight loss decay is probably associated with the loss of residual solvent since those particles were not dried at elevated temperature prior to the analysis. At 500° C., another drop (2%) in weight could be associated with the decomposition of the grafted polymer. A rough estimation of the thickness of the polymer layer on the surface of the particles can be performed by assuming a mean particle diameter of 42 μm, density of the polymer equal to 1.2 g/cm$^3$ (density of pure polysulfone) and spherical shape. The result of this analysis reveals a thickness of 300 nm for the grafted polymer.

It is hypothesized that the chemistry of interaction between the modified polysulfone and the surface of the glass is that the acid groups on the sulfonated polysulfone (—SO$_2$OH) would react with amine groups (from the silane agent). Therefore, the reaction would proceed by the elimination of water and formation of bonds such as —SO$_2$NH—.

Mechanical Properties of Polysulfone-Bioactive Glass Composites with Different Interfacial Modifiers Stress-strain curves were obtained from four-point bending tests on composites containing 20% volume of bioactive glass particles (45–38 μm) and different surface treatments. The composites tested had:

(a) untreated particles
(b) silane treated particles
(c) particles with sulfonated polysulfone grafts.

Figure 2:
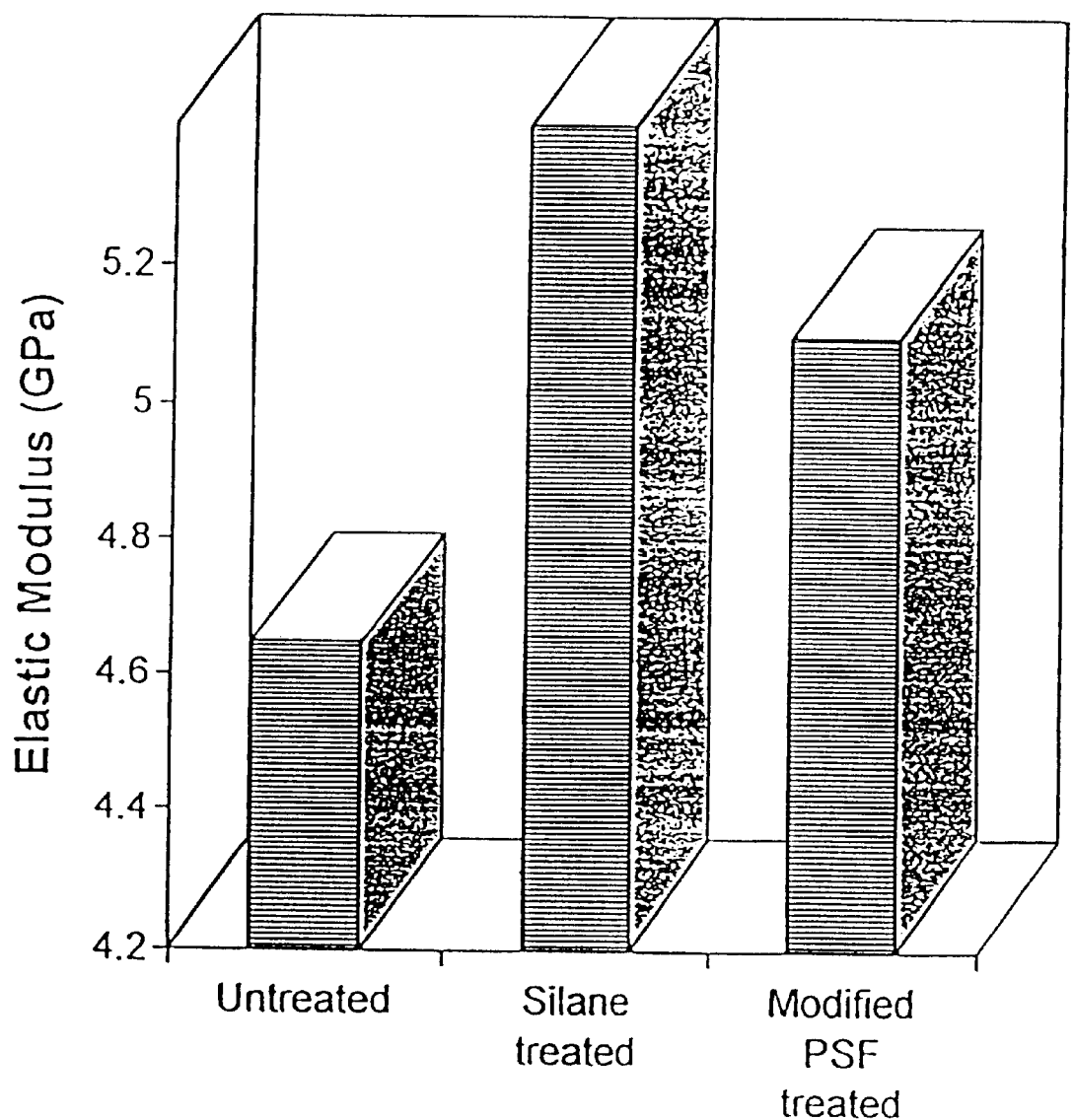
Figure 3:
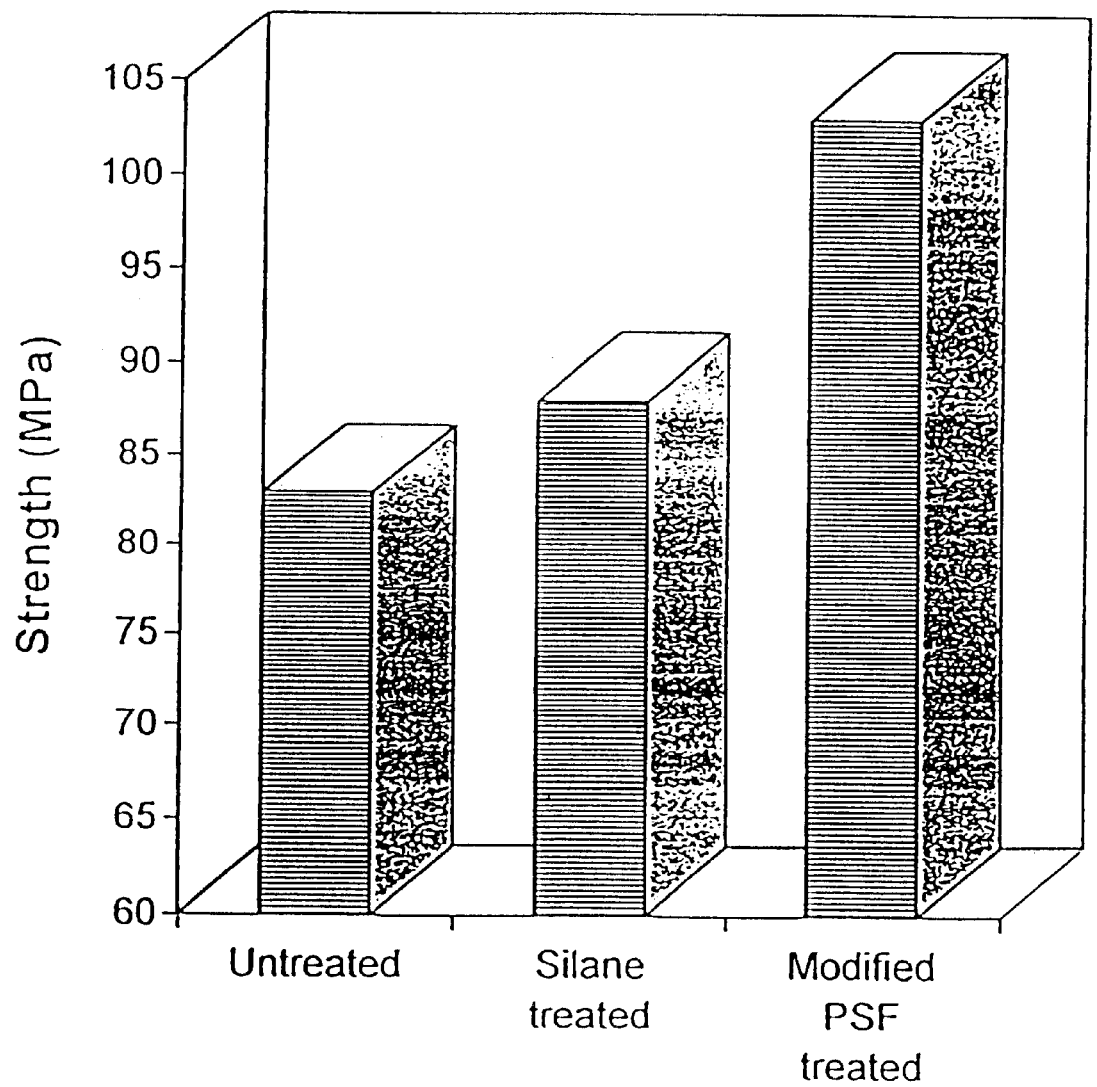
Figure 4:
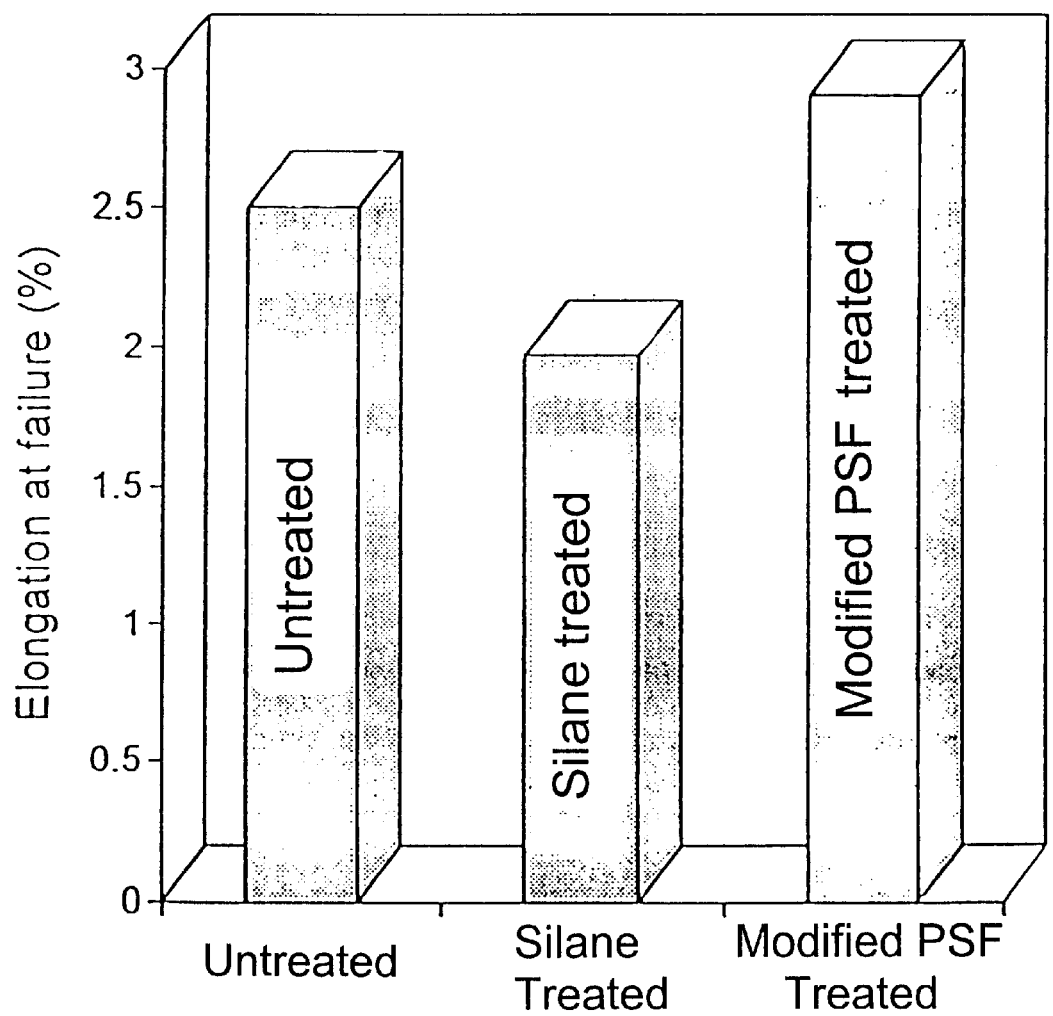

The results are shown in FIG. 1 and are further expressed in FIGS. 2–4. It is possible to see in both FIGS. 1 and 2 that the elastic modulus of the composites is improved dramatically by using the surface treatments on bioactive glass particles. It is clear that the largest improvement is obtained when silane coupling agents are used, but also the particles with the grafted polymer showed higher modulus than the composite with untreated particulate.

FIG. 3 summarizes the results for the strength of the tested composites. It is possible to see that the silane treatment can lead to an improvement in strength of the composites, but the highest improvement could be obtained by grafting polymers on the surface of the particles. It is important to emphasize that the yield strength of the polysulfone is around 105 MPa, and values close to this number could be obtained by the particulate composite with grafts. Thus, for the first time, the introduction of bioactive glass particles does not reduce the mechanical properties of the pure polymer. The silane treated particles, although producing the highest stress transfer and increase in modulus, probably lead to the formation of a very rigid interface that cannot dissipate the energy of cracks. Thus, any cracks that are formed due to the angular particle shape can propagate with less interference and energy relief. On the other hand, the polymer grafts on particulate composites are probably helping in dissipating the energy for crack propagation, improving toughness and increasing the stress at break.

FIG. 4 (and also FIG. 1) reveals that the silane treated particulate composites lead to lower values of strain at break, meaning that the composite is behaving in a more brittle way. This can be again explained by the formation of rigid interfaces that do not have any mechanism of energy relief on crack tips. For the untreated particulate composite, formation of voids can increase the radius of the crack tip, therefore increasing the energy for their propagation. The particulate composite with polymer grafts on particle surfaces leads to higher elongation to failure that can be translated to high levels of toughness. In this case, the polymeric films on the surface of the particles are acting as barriers for crack propagation and source of energy dissipation in the interfaces.

Summarizing, the use of the polysulfone grafts on bioactive glass particles leads to:

composites with higher levels of toughness
high levels of stress transfer across the interface, observed by the increase in modulus and strength in comparison to untreated particulate composites.

DMS on Composites Having Different Interfacial Treatments

Figure 5:
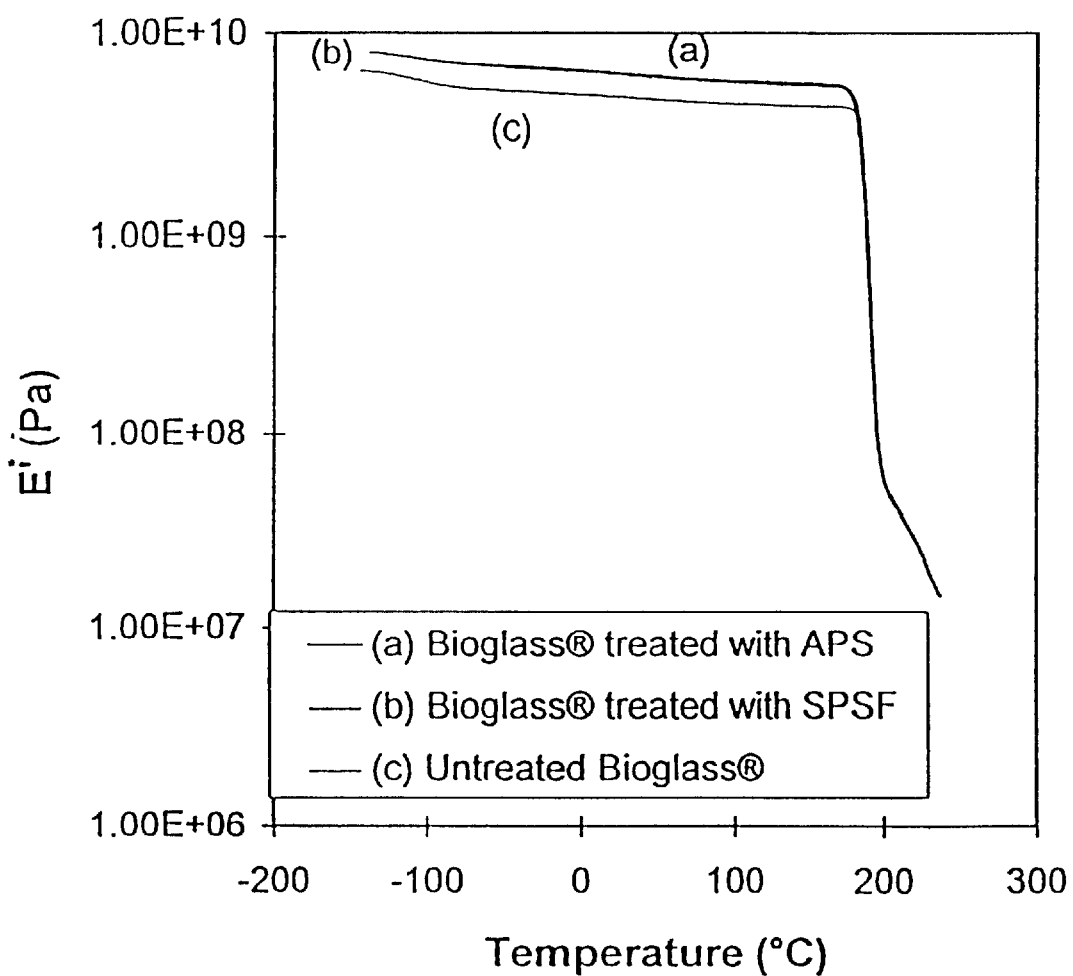

FIG. 5 shows the effect of temperature on elastic modulus (1 Hz) of PSF composites with different interfacial treatments. As first reported by the mechanical test, elastic modulus of composites that were either treated with silane or with the modified version of polysulfone are higher than for composites with untreated particles. Table 2 also reports the values obtained from DMS at 1 Hz and 25° C. The values for elastic modulus of 20% particulate composite with treated interfaces are even in the same order than the modulus once obtained for untreated 40% particulate composites.

TABLE 2

DMS Results of Polysulfone Composites with 20% Volume of Bioactive Glass: Tailoring Interfaces

| DMS Results | PSF20BG[1] Untreated | PSF20BG Silane[2] Treated | PSF20BG SPSF[3] + Silane Treated |
|---|---|---|---|
| E' [GPa]: 1 Hz at 25° C. | 4.78 | 6.2 | 6.0 |
| Temperature of glass transition (Tg) [° C.] | 194.0 | 193.7 | 193.4 |
| Loss tangent at Tg | 1.39 | 1.25 | 1.4 |
| Activation energy [kj/mol] - Tg | 896 | 910 | 929 |
| Temperature of sub - Tg transition [° C.] | −106.7 | −102.5 | −102.0 |
| Loss tangent at sub - Tg | 0.02 | 0.02 | 0.02 |
| Activation energy [kJ/mol] - sub - Tg | 38.7 | 44.0 | 48.2 |

Figure 6:
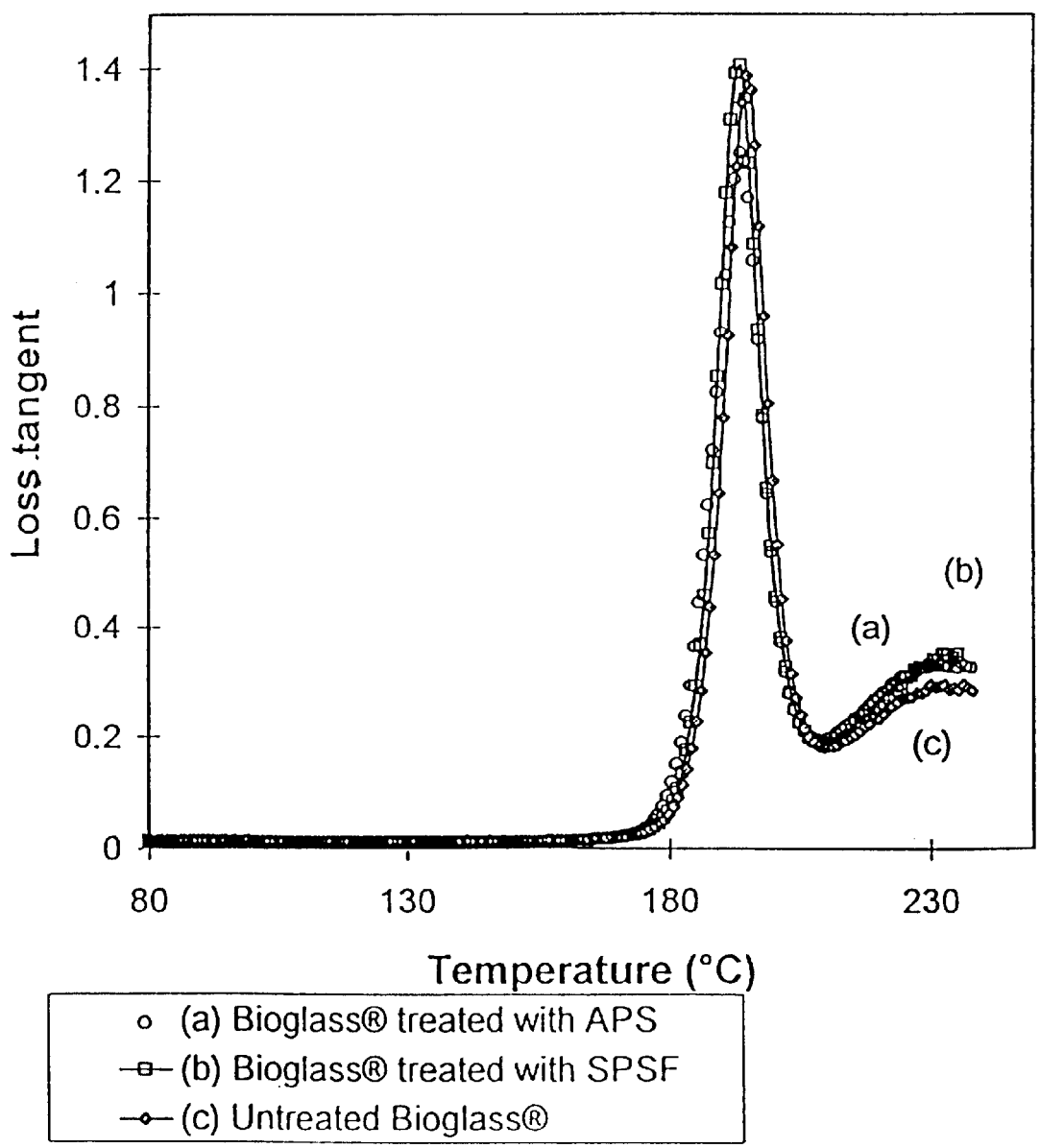

[1]PSF20BG = polysulfone with 20% volume of bioactive glass particles (45–38 μm)
[2]Aminopropyl triethoxysilane
[3]SPSF = sulfonated polysulfone Interestingly, no major changes on the α-relaxation of the composites could be observed (as noted in FIG. 6). No major changes in the temperature of glass transition and values for the loss tangent could be seen as they could be expected from the previous results of mechanical test. Table 2 also reports the values found for Tg, loss tangent at Tg and activation energy for this transition. On the other hand, the activation energy for the transition was observed to increase from untreated composites to treated ones. The larger activation energy was obtained when the particles were treated with the modified polysulfone. From the results of activation energy, it seems that the interfacial modification interferes with the processes related to the loss transition by reducing the mobility of the chains close to the interface of the composite.

Figure 7:
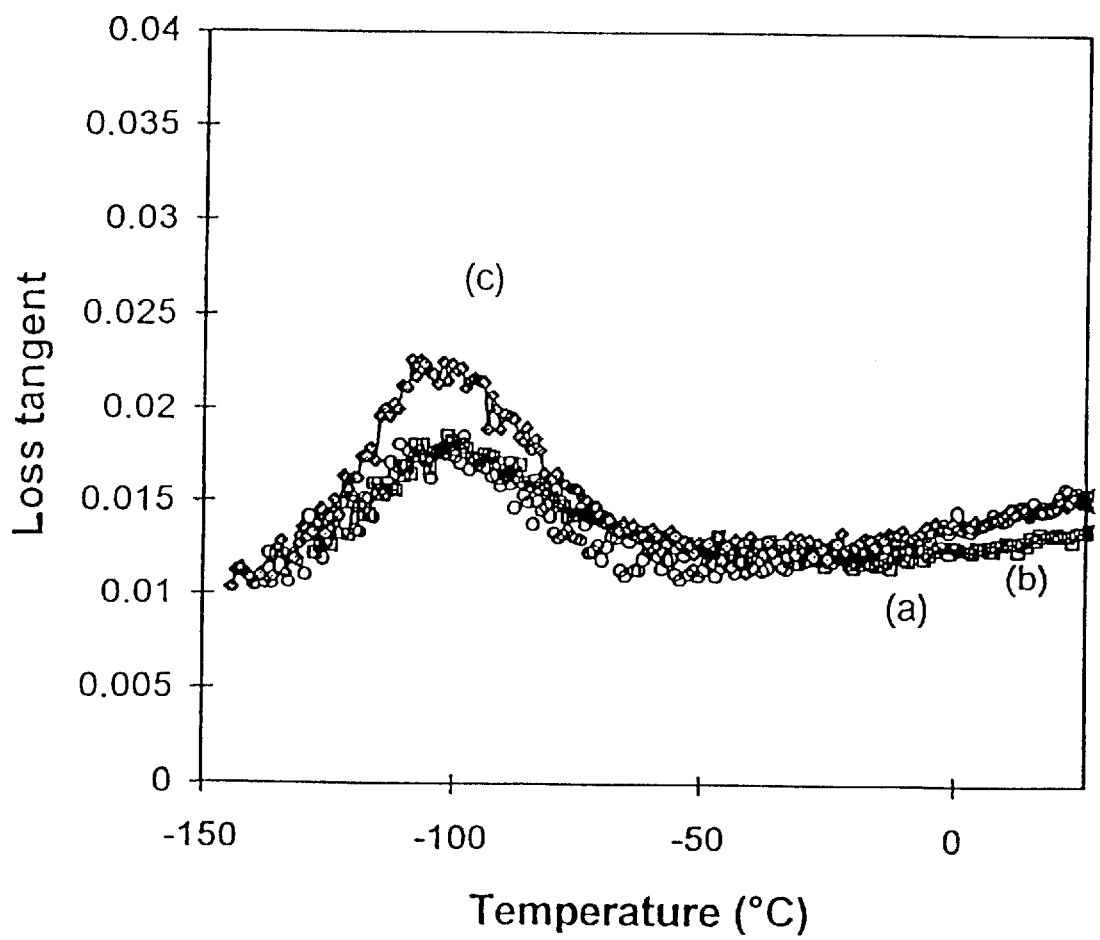

The effect of the different interfacial treatments on the particulate composites can be more readily apparent when the loss tangent at the γ-relaxation is studied. The usual trend of increasing the temperature of the transition and reduction on the loss tangent values when rigid interphases are built up can be observed when untreated composites are compared to silane treated and modified polysulfone treated polymers (FIG. 7). As reported in Table 2, the values for loss tangent are lower and the activation energy is higher for the treated composite in comparison with the untreated ones.

Figure 8:
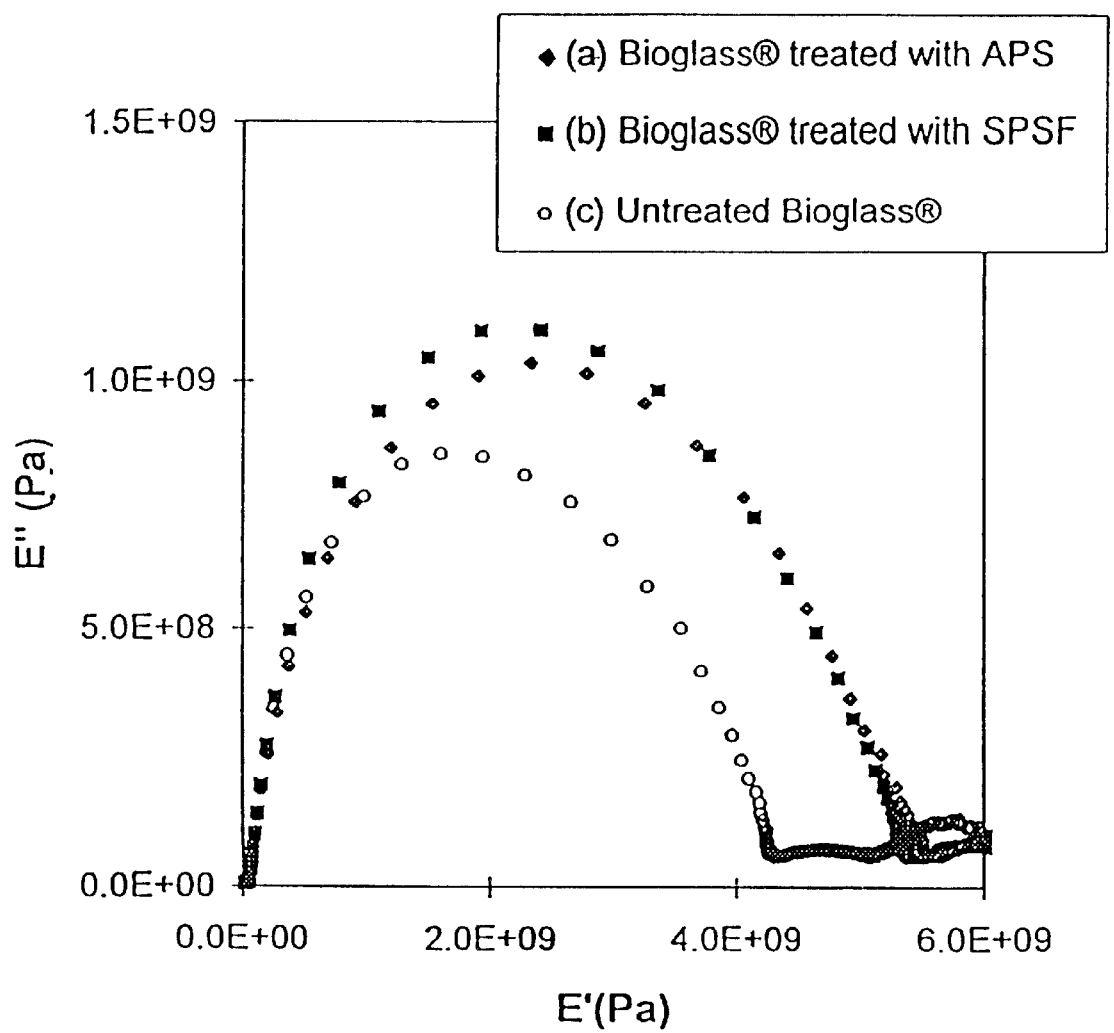

In order to get more information about the effect of the interfacial modification on the relaxation processes of the matrix, a physical model that relates the dynamic (complex) elastic modulus to the unrelaxed, relaxed modulus, relaxation times and uses parameters from the Cole-Cole plot to fit the experimental data to the model can be used. The Cole-Cole type of plot for the three different composites in study can be seen in FIG. 8. The large difference on the aspect of the plot shows clearly that the modification of the interface is really altering the phenomena associated to chain mobility. Parameters h and k are used to fit the model to the data. Both parameters can be obtained from angles in which the curves reach the E' axis of the Cole-Cole plot: $h=2\Theta_r/\pi$ and $k=2\Theta_{\mu}/\pi$ and h is the long time parameter and k is the short time parameter. The values of h and k and unrelaxed and relaxed modulus for the composites are displayed in Table 3. Reduction in the values of h and k (mainly in k) when the interfacial modification is performed clearly demonstrates these modifications introduce constraints by reducing the chain mobility at the interface, i.e., improves adhesion between the polymer and reinforcing phase. Parameters h and k provide a measure of the strength of the interaction between the polymer and the reinforcing phase.

TABLE 3

Physical Modeling of Interfaces Using Cole-Cole Type of Plot: PSF20BG Composites with Tailored Interfaces

| Type Interfacial Modification | Relaxed Elastic Modulus (MPa) | Unrelaxed Elastic Modulus (GPa) | h | k |
|---|---|---|---|---|
| Non-modified | 40 | 4.4 | 0.74 | 0.59 |
| Silane | 45 | 5.7 | 0.69 | 0.29 |
| Sulfonated PSF | 48 | 5.5 | 0.71 | 0.38 |
| Pure PSF | 60 | 2.7 | 0.72 | 0.9 |

Characterization of the Surface of Glass Slides by AFM

AFM in the tapping mode produced images (not shown) of surfaces in which silanated PSF was grafted. The glass slides have a very smooth surface with features less than 5 nm in height. Some defects on the surface can also be observed such as deep valleys.

These observations show that the grafting procedure was successfully performed and polymers with a high degree of silanation lead to a more rough surface, presumably due to the self-reaction between silanated chains.

Testing Mechanically Polysulfone-Bioactive Glass Composites With Different Interfacial Agents Including Organic/Inorganic Composites As described in the above examples, several different interfacial agents based on modified polysulfone were tested in bioactive glass-polysulfone composites, including an aminated polysulfone, chlorinated polysulfone and an organic/inorganic composite made from sulfonated polysulfone/silanes.

Figure 9:
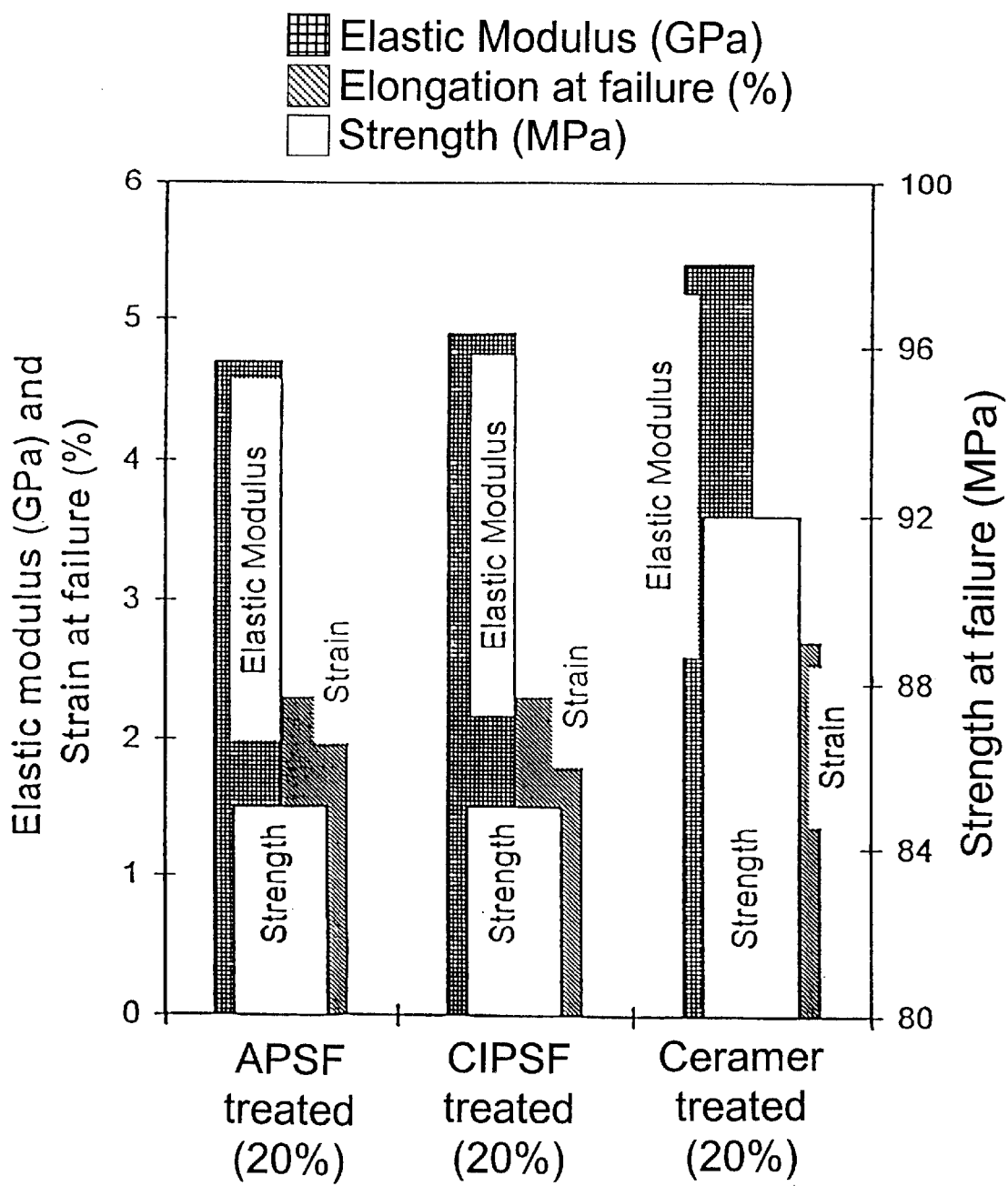

The results of the four-point bending test are shown in FIG. 9 and are set forth in Table 4. It is possible to see that the mechanical properties of composites with aminated and chlorinated polysulfone are not very different than those of untreated composites. These results agree well with the results from XPS on grafted bioactive glass disks. XPS showed that the grafting yield is not very large for those types of polymers, meaning that the interactions are not specific enough to lead to formation of primary bonds across the interphase. Therefore, the lack of major enhancement in interactions across the interphase in composites having those modified polysulfones as interfacial agents lead to non-efficient improvement in properties via maximization of interfacial strength.

On the other hand, both FIG. 9 and Table 4 show that the mechanical properties of composites having the organic/inorganic composite as an interfacial agent are very different from the untreated composite. Basically, strength, strain at failure and elastic modulus are larger for the organic/ inorganic composite treated particles in comparison to the untreated composite.

TABLE 4

Mechanical Properties of Polysulfone -
20% Bioactive Glass Particulate Composites with
Different Interfacial Agents

| Interfacial Agent | Elastic Modulus (GPa) | Strength (MPa) | Strain (%) |
|---|---|---|---|
| None | 4.7 | 83 | 2.5 |
| 3-aminopropyltriethoxysilane | 5.2 | 88 | 2.0 |
| Grafted SPSF | 5.1 | 103 | 2.9 |
| Hybrid SPSF - 10% silica | 5.4 | 95 | 2.6 |
| Hybrid SPSF - 20% silica | 5.4 | 91 | 2.6 |

Figure 10:
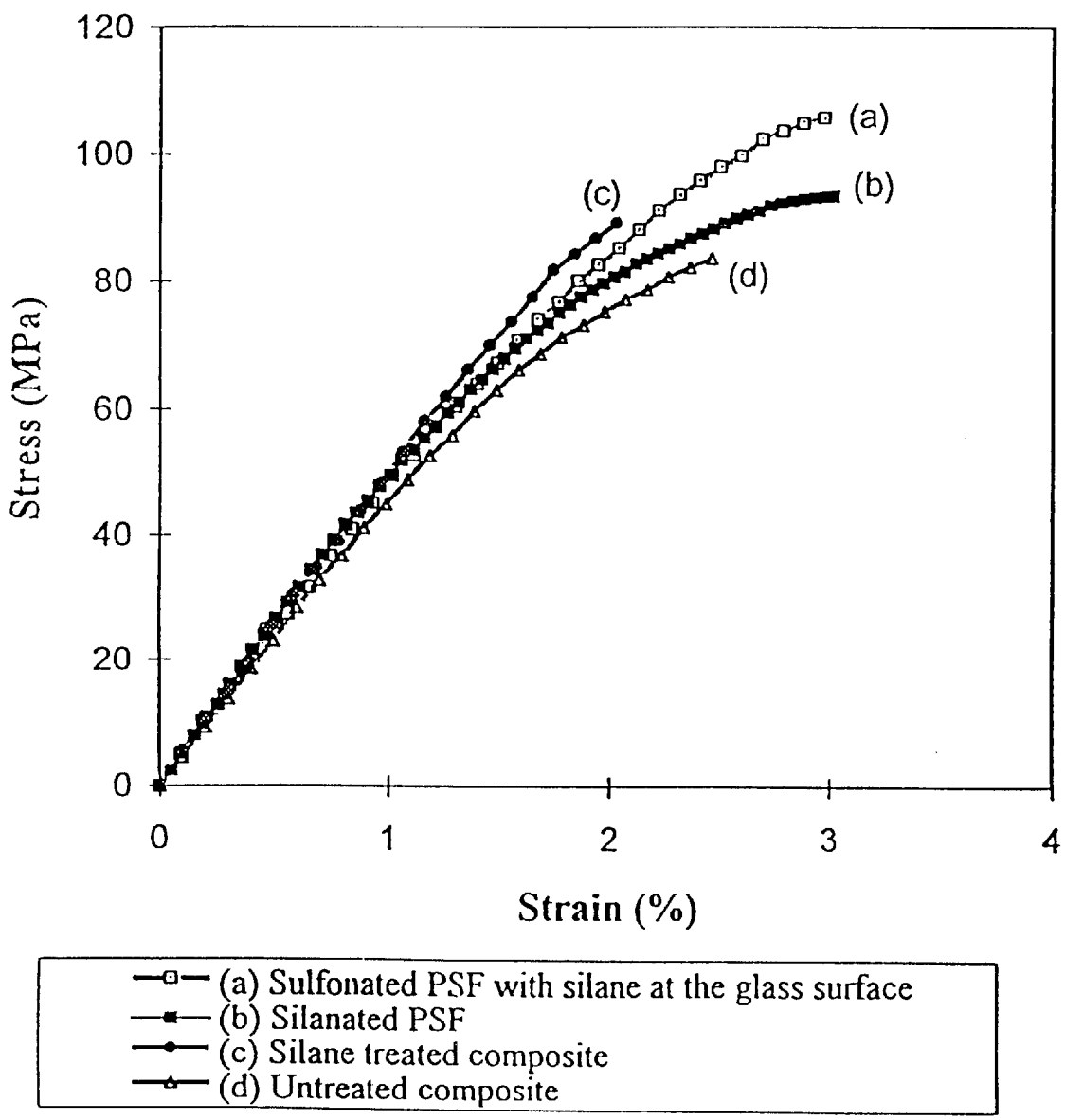

FIG. 10 summarizes all of the above results regarding tailoring the interface of bioactive glass-polysulfone composites by using modified versions of polysulfones. In this figure, stress-strain curves for composites (bioactive glass-polysulfone composites—20% volume fraction) having different interfacial treatments were plotted. The properties of the following composites are shown:

1. untreated bioactive glass particles
2. aminosilane treated bioactive glass treated particles
3. particles treated first with a silane coupling agent and then reacted against the sulfonated polysulfone
4. particles treated with an organic/inorganic composite made of sulfonated polysulfone and silane agents.

These results show that the major improvement in properties occurred when the interface was treated with a silane and then reacted with the sulfonated polysulfone. In this case, the larger improvements in strain at failure, strength and some improvement in elastic modulus were obtained. On the other hand, when the organic/inorganic composite was used as an interfacial agent, the highest elastic modulus was obtained, but strength and strain at failure (Table 4) were lower than the composite with a sulfonated polysulfone reacted against a silanated glass surface. It seems that a rigid interface as in the case of the organic/inorganic composite that has a large content of silica can transfer stress very efficiently, but toughness is not enhanced due to the brittleness of the interface On the other hand, in the case of the sulfonated polymer reacted be against a silanated surface, free ends of chains are very likely to occur and those free chains can potentially entangle with the surrounding matrix, leading to high levels of both stress transfer and also mechanisms for crack energy dissipation.

It is possible to see that the mechanical properties of composites having hybrids as interfacial agents are very different from the untreated composite. Basically, strength, strain at failure and elastic modulus are larger for the organic/inorganic composite treated particles in comparison to the untreated composite.

The results shown here demonstrate that the major improvement in strength (due to an improvement in toughness) occurs when the interface is treated with a silane and then reacted with the sulfonated polysulfone. In this case, larger improvements in strain at failure, strength and some improvement in elastic modulus are obtained as a consequence of the presence of free ends of chains that can potentially entangle with the surrounding matrix, leading to both stress transfer and also mechanisms for crack energy dissipation. On the other hand, when the hybrids were used as interfacial agents, the highest elastic modulus was obtained, but strength and strain at failure (Table 4) were lower than the composite with a sulfonated polysulfone reacted against a silanated glass surface. It seems that the interphase with values of modulus intermediary in relation to matrix and particles can transfer stress very efficiently, but toughness is not enhanced due to the brittleness of the interphase and lack of mechanisms of energy dissipation. The variation on the composition of the hybrids within the range studied seems not to affect the macroproperties of the composites.

We claim:

1. As a composition of matter, a mixture of (1) a silane fuctionalized polyaromatic polymer and (2) an inorganic material or an organic material, said inorganic or organic material comprising glass, bone, hydroxyapatite, ceramic, glass-ceramic bioactive material or allograft, and containing a network of moieties reactive with the silane groups of said polymer under conditions which do not substantially destabilize said organic and inorganic materials to provide a covalent bond between said moieties and said silane groups.

2. The composition of matter of claim 1 wherein said silane functionalized polyaromatic polymer is formed by:
   (a) reacting a polyaromatic polymer with a sulfonating agent to introduce sulfonic acid groups on aromatic rings in said polyaromatic polymer, and
   (b) reacting the product of (a) with a silane terminated coupling agent capable of undergoing a condensation reaction with the sulfonic acid groups thereof to produce a polyaromatic polymer having silane terminated groups on the aromatic rings thereof; said reactions (a) and (b) being conducted under conditions which do not substantially destabilize said polyaromatic polymer.

3. The composition of matter of claim 2 wherein said polyaromatic polymer is a polyarylsulfone, polyarylethersulfone, polyarylimide, polyarylcarbonate, polyaryloxide, polyarylether, polyaryletherketone, polyarylalkene or copolymers or mixtures thereof.

4. The composition of matter of claim 3 wherein said polyaromatic polymer is a polyarylsulfone.

5. The composition of matter of claim 4 wherein said polyarylsulfone is polyphenylenesulfone.

6. The composition of matter of claim 3 wherein said polyaromatic polymer is a polyarylcarbonate.

7. The composition of matter of claim 6 wherein said polyarylcarbonate is poly(bis-phenol A carbonate).

8. The composition of matter of claim 2 wherein said sulfonating agent is chlorosulfonic acid.

9. The composition of matter of claim 2 wherein said silane terminated coupling agent has the formula:

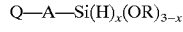

wherein:
   Q is a functional group capable of reacting with said sulfonic acid groups;
   A is a non-reactive bridging group between Q and Si;
   R is an alkyl or alkenyl group having 1 to 4 carbon atoms; and
   x is an integer from 0 to 2.

10. The composition of matter of claim 9 wherein Q is

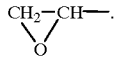

11. The composition of matter of claim 9 wherein Q is $NH_2-$.

12. The composition of matter of claim 9 wherein A is alkylene.

13. The composition of matter of claim 9 wherein x is 0.

14. The composition of matter of claim 9 wherein said coupling agent has the formula:

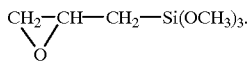

15. The composition of matter of claim 9 wherein said coupling agent has the formula:

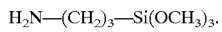

16. The composition of matter of claim 2 wherein the molar ratio of sulfonating agent to polyaromatic polymer is from about 1:1 to about 180:1.

17. The composition of matter of claim 16 wherein said ratio is from about 45:1 to about 125:1.

18. The composition of matter of claim 1 wherein said silane functionalized polyaromatic polymer has the formula:

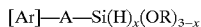

wherein:
Ar is a repeating aromatic ring in said polyaromatic polymer;
A is a non-reactive bridging group between Ar and Si;
R is an alkyl or alkenyl group having 1 to 4 carbon atoms; and
x is an integer from 0 to 2.

19. The composition of matter of claim 18 wherein said polyaromatic polymer is a polyarylsulfone, polyarylethersulfone, polyarylimide, polyarylcarbonate, polyaryloxide, polyarylether, polyaryletherketone, polyarylalkene or copolymers or mixtures thereof.

20. The composition of matter of claim 18 wherein said polyaromatic polymer is a polyarylsulfone.

21. The composition of matter of claim 20 wherein said polyarylsulfone is polyphenylenesulfone.

22. The composition of matter of claim 18 wherein said polyaromatic polymer is a polyarylcarbonate.

23. The composition of matter of claim 22 wherein said polyarylcarbonate is poly(bis-phenol A carbonate).

24. The composition of matter of claim 18 wherein A is alkylene.

25. The composition of matter of claim 18 wherein x is 0.

26. The composition of matter of claim 1 wherein the reactive moieties in said network comprising said organic or inorganic material are silica, silicate, phosphate, hydrogen phosphate, carbonate and fluorosilicate.

27. The composition of matter of claim 1 wherein said organic or inorganic material comprises glass, bone, hydroxyapatite, ceramic, glass-ceramic bioactive material and allograft.

28. The composition of matter of claim 1 comprising a nanophase composite.

29. The composition of matter of claim 1 comprising a nanophase composite based upon sol-gel processing.

30. As a composition of matter, a composite formed by reacting the mixture of claim 1 under said conditions to form a composite comprising said organic or inorganic material covalently bonded to said polyaromatic polymer.

31. The composition of matter of claim 30 wherein said silane functionalized polyaromatic polymer is formed by:
(a) reacting a polyaromatic polymer with a sulfonating agent to introduce sulfonic acid groups on aromatic rings in said polyaromatic polymer, and
(b) reacting the product of (a) with a silane terminated coupling agent capable of undergoing a condensation reaction with the sulfonic acid groups thereof to produce a polyaromatic polymer having silane terminated groups on the aromatic rings thereof; said reactions (a) and (b) being conducted under conditions which do not substantially destabilize said polyaromatic polymer.

32. The composition of matter of claim 31 wherein said polyaromatic polymer is a polyarylsulfone, polyarylethersulfone, polyarylimide, polyarylcarbonate, polyaryloxide, polyarylether, polyaryletherketone, polyarylalkene or copolymers or mixtures thereof.

33. The composition of matter of claim 30 wherein said polyaromatic polymer is a polyarylsulfone.

34. The composition of matter of claim 33 wherein said polyarylsulfone is polyphenylenesulfone.

35. The composition of matter of claim 30 wherein said polyaromatic polymer is a polyarylcarbonate.

36. The composition of matter of claim 35 wherein said polyarylcarbonate is poly(bis-phenol A carbonate).

37. The composition of matter of claim 31 wherein said sulfonating agent is chlorosulfonic acid.

38. The composition of matter of claim 31 wherein said silane terminated coupling agent has the formula:

wherein:
Q is a functional group capable of reacting with said sulfonic acid groups;
A is a non-reactive bridging group between Q and Si;
R is an alkyl or alkenyl group having 1 to 4 carbon atoms; and
x is an integer from 0 to 2.

39. The composition of matter of claim 38 wherein Q is

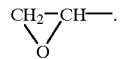

40. The composition of matter of claim 38 wherein Q is NH$_2$—.

41. The composition of matter of claim 38 wherein A is alkylene.

42. The composition of matter of claim 38 wherein x is 0.

43. The composition of matter of claim 38 wherein said coupling agent has the formula:

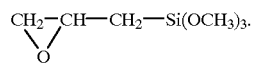

44. The composition of matter of claim 38 wherein said coupling agent has the formula:

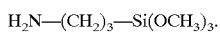

45. The composition of matter of claim 31 wherein the molar ratio of sulfonating agent to polyaromatic polymer is from about 1:1 to about 180:1.

46. The composition of matter of claim 45 wherein said ratio is from about 45:1 to about 125:1.

47. The composition of matter of claim 30 wherein said silane functionalized polyaromatic polymer has the formula:

$$[Ar]-A-Si(H)_x(OR)_{3-x}$$

wherein:
Ar is a repeating aromatic ring in said polyaromatic polymer;
A is a non-reactive bridging group between Ar and Si;
R is an alkyl or alkenyl group having 1 to 4 carbon atoms; and
x is an integer from 0 to 2.

48. The composition of matter of claim 47 wherein said polyaromatic polymer is a polyarylsulfone, polyarylethersulfone, polyarylimide, polyarylcarbonate, polyaryloxide, polyarylether, polyaryletherketone, polyarylalkene or copolymers or mixtures thereof.

49. The composition of matter of claim 30 wherein said polyaromatic polymer is a polyarylsulfone.

50. The composition of matter of claim 49 wherein said polyarylsulfone is polyphenylenesulfone.

51. The composition of matter of claim 30 wherein said polyaromatic polymer is a polyarylcarbonate.

52. The composition of matter of claim 51 wherein said polyarylcarbonate is poly(bis-phenol A carbonate).

53. The composition of matter of claim 30 wherein A is alkylene.

54. The composition of matter of claim 30 wherein x is 0.

55. The composition of matter of claim 30 wherein the reactive moieties in said network comprising said organic or inorganic material are silica, silicate, phosphate, hydrogen phosphate, carbonate and fluorosilicate.

56. The composition of matter of claim 30 comprising a nanophase composite.

57. The composition of matter of claim 30 comprising a nanophase composite based upon sol-gel processing.

58. As a composition of matter, a composite comprising a silane functionalized polyaromatic polymer bonded via said silane groups to an organic or inorganic material comprising glass, bone, hydroxyapatite, ceramic, glass-ceramic bioactive material or allograft, and containing a network of moieties reactive with said silane groups by a condensation reaction to form covalent bonds therebetween.

59. The composition of matter of claim 58 wherein said silane functionalized polyaromatic polymer is formed by:
(a) reacting a polyaromatic polymer with a sulfonating agent to introduce sulfonic acid groups on aromatic rings in said polyaromatic polymer, and
(b) reacting the product of (a) with a silane terminated coupling agent capable of undergoing a condensation reaction with the sulfonic acid groups thereof to produce a polyaromatic polymer having silane terminated groups on the aromatic rings thereof; said reactions (a) and (b) being conducted under conditions which do not substantially destabilize said polyaromatic polymer.

60. The composition of matter of claim 59 wherein said polyaromatic polymer is a polyarylsulfone, polyarylethersulfone, polyarylimide, polyarylcarbonate, polyaryloxide, polyarylether, polyaryletherketone, polyarylalkene or copolymers or mixtures thereof.

61. The composition of matter of claim 59 wherein said polyaromatic polymer is a polyarylsulfone.

62. The composition of matter of claim 60 wherein said polyarylsulfone is polyphenylenesulfone.

63. The composition of matter of claim 62 wherein said polyaromatic polymer is a polyarylcarbonate.

64. The composition of matter of claim 60 wherein said polyarylcarbonate is poly(bis-phenol A carbonate).

65. The composition of matter of claim 64 wherein said sulfonating agent is chlorosulfonic acid.

66. The composition of matter of claim 59 wherein said silane terminated coupling agent has the formula:

$$Q-A-Si(H)_x OR_{3-x}$$

wherein:
Q is a functional group capable of reacting with said sulfonic acid groups;
A is a non-reactive bridging group between Q and Si;
R is an alkyl or alkenyl group having 1 to 4 carbon atoms; and
x is an integer from 0 to 2.

67. The composition of matter of claim 66 wherein Q is

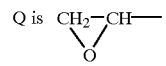

68. The composition of matter of claim 66 wherein Q is $NH_2-$.

69. The composition of matter of claim 66 wherein A is alkylene.

70. The composition of matter of claim 66 wherein x is 0.

71. The composition of matter of claim 66 wherein said coupling agent has the formula:

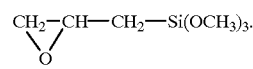

72. The composition of matter of claim 66 wherein said coupling agent has the formula:

$$H_2N-(CH_2)_3-Si(OCH_3)_3.$$

73. The composition of matter of claim 59 wherein the molar ratio of sulfonating agent to polyaromatic polymer is from about 1:1 to about 180:1.

74. The composition of matter of claim 73 wherein said ratio is from about 45:1 to about 125:1.

75. The composition of matter of claim 59 wherein said silane functionalized polyaromatic polymer has the formula:

$$[Ar]-A-Si(H)_x(OR)_{3-x}$$

wherein:
Ar is a repeating aromatic ring in said polyaromatic polymer;
A is a non-reactive bridging group between Ar and Si;
R is an alkyl or alkenyl group having 1 to 4 carbon atoms; and
is an integer from 0 to 2.

76. The composition of matter of claim 75 wherein said polyaromatic polymer is a polyarylsulfone, polyarylethersulfone, polyarylimide, polyarylcarbonate, polyaryloxide, polyarylether, polyaryletherketone, polyarylalkene or copolymers or mixtures thereof.

77. The composition of matter of claim 75 wherein said polyaromatic polymer is a polyarylsulfone.

78. The composition of matter of claim 77 wherein said polyarylsulfone is polyphenylenesulfone.

79. The composition of matter of claim 75 wherein said polyaromatic polymer is a polyarylcarbonate.

80. The composition of matter of claim 79 wherein said polyarylcarbonate is poly(bis-phenol A carbonate).

81. The composition of matter of claim 75 wherein A is alkylene.

82. The composition of matter of claim 75 wherein x is 0.

83. The composition of matter of claim 58 wherein the reactive moieties in said network comprising said inorganic material are silica, silicate, phosphate, hydrogen phosphate, carbonate and fluorosilicate.

84. The composition of matter of claim 58 wherein said inorganic material comprises glass, bone, hydroxyapatite, ceramic, glass-ceramic bioactive material and allograft.

85. The composition of matter of claim 58 comprising a nanophase composite.

86. The composition of matter of claim 59 comprising a nanophase composite based upon sol-gel processing.

87. A method of forming a composite comprising reacting the mixture of claim 59 under said conditions to form a composite comprising said organic or inorganic material covalently bonded to said polyaromatic polymer.

88. The method of claim 87 wherein said silane functionalized polyaromatic polymer is formed by:
  (a) reacting a polyaromatic polymer with a sulfonating agent to introduce sulfonic acid groups on aromatic rings in said polyaromatic polymer, and
  (b) reacting the product of (a) with a silane terminated coupling agent capable of undergoing a condensation reaction with the sulfonic acid groups thereof to produce a polyaromatic polymer having silane terminated groups on the aromatic rings thereof; said reactions (a) and (b) being conducted under conditions which do not substantially destabilize said polyaromatic polymer.

89. The method of claim 87 wherein said polyaromatic polymer is a polyarylsulfone, polyarylethersulfone, polyarylimide, polyarylcarbonate, polyaryloxide, polyarylether, polyaryletherketone, polyarylalkene or copolymers or mixtures thereof.

90. The method of claim 87 wherein said polyaromatic polymer is a polyarylsulfone.

91. The method of claim 90 wherein said polyarylsulfone is polyphenylenesulfone.

92. The method of claim 87 wherein said polyaromatic polymer is a polyarylcarbonate.

93. The method of claim 92 wherein said polyarylcarbonate is poly(bis-phenol A carbonate).

94. The method of claim 88 wherein said sulfonating agent is chlorosulfonic acid.

95. The method of claim 88 wherein said silane terminated coupling agent has the formula:

$$Q-A-Si(H)_x(OR)_{3-x}$$

wherein:
  Q is a functional group capable of reacting with said sulfonic acid groups;
  A is a non-reactive bridging group between Q and Si;
  R is an alkyl or alkenyl group having 1 to 4 carbon atoms; and
  x is an integer from 0 to 2.

96. The method of claim 95 wherein Q is

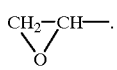

97. The method of claim 95 wherein Q is $NH_2-$.

98. The method of claim 95 wherein A is alkylene.

99. The method of claim 95 wherein x is 0.

100. The method of claim 95 wherein said coupling agent has the formula:

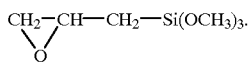

101. The method of claim 95 wherein said coupling agent has the formula:

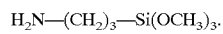

102. The method of claim 88 wherein the molar ratio of sulfonating agent to polyaromatic polymer is from about 1:1 to about 180:1.

103. The method of claim 102 wherein said ratio is from about 45:1 to about 125:1.

104. The method of claim 87 wherein said silane functionalized polyaromatic polymer has the formula:

$$[Ar]-A-Si(H)_x(OR)_{3-x}$$

wherein:
  Ar is a repeating aromatic ring in said polyaromatic polymer;
  A is a non-reactive bridging group between Ar and Si;
  R is an alkyl or alkenyl group having 1 to 4 carbon atoms; and
  x is an integer from 0 to 2.

105. The method of claim 104 wherein said polyaromatic polymer is a polyarylsulfone, polyarylethersulfone, polyarylimide, polyarylcarbonate, polyaryloxide, polyarylether, polyaryletherketone, polyarylalkene or copolymers or mixtures thereof.

106. The method of claim 104 wherein said polyaromatic polymer is a polyarylsulfone.

107. The method of claim 106 wherein said polyarylsulfone is polyphenylenesulfone.

108. The method of claim 104 wherein said polyaromatic polymer is a polyarylcarbonate.

109. The method of claim 108 wherein said polyarylcarbonate is poly(bis-phenol A carbonate).

110. The method of claim 104 wherein A is alkylene.

111. The method of claim 104 wherein x is 0.

112. The method of claim 87 wherein the reactive moieties in said network comprising said organic or inorganic material are silica, silicate, phosphate, hydrogen phosphate, carbonate and fluorosilicate.

113. The method of claim 87 wherein said reaction produces a nanophase composite.

114. The method of claim 87 wherein said reaction produces a nanophase composite based upon sol-gel processing.

115. An article of manufacture constructed of the composition of matter of claim 88.

* * * * *

UNITED STATES PATENT AND TRADEMARK OFFICE
CERTIFICATE OF CORRECTION

PATENT NO. : 6,399,693 B1
DATED : June 4, 2002
INVENTOR(S) : Anthony B. Brennan, Michael P. Zamora and Rodrigo L. Orefice It is certified that error appears in the above-identified patent and that said Letters Patent is hereby corrected as shown below:

<u>Column 6,</u>
Lines 13-21, "added.

The solution was stirred for five minutes and TEOS followed by water (water/silane molar ratio=3) at pH=1.5 (adjusted by using $HNO_3$) were added and films were cast on glass slides at 60° C. and dried overnight at 160° C. The final composition of the solution had SPSF/silanes weight ratios equal to 1. Films having one silane group per repeat unit and two silane groups per repeat unit were produced." should read -- added. The solution was stirred for five minutes and TEOS followed by water (water/silane molar ratio = 3) at pH =1.5 (adjusted by using $HNO_3$) were added and films were cast on glass slides at 60° C and dried overnight at 160° C. The final composition of the solution had SPSF/silanes weight ratios equal to 1. Films having one silane group per repeat unit and two silane groups per repeat unit were produced. --

<u>Column 11,</u>
Line 25: "[kj" should read -- [kJ --.

<u>Column 13,</u>
Line 44: "interface On" should read -- interface. On --.
Line 45, "reacted be against" should read -- reacted against --.

<u>Column 17,</u>
Line 60, "claim 60" should read -- claim 61 --.
Line 62, "claim 62" should read -- claim 59 --.
Line 64, "claim 60" should read -- claim 63 --.
Line 66, "claim 64" should read -- claim 59 --.

<u>Column 18,</u>
Lines 13-17,

"Q is
   Q is $CH_2$—CH— " should read --"Q is $CH_2$—CH—  --.
       \   /                                     \   /
        O                                         O

UNITED STATES PATENT AND TRADEMARK OFFICE
CERTIFICATE OF CORRECTION

PATENT NO. : 6,399,693 B1
DATED : June 4, 2002
INVENTOR(S) : Anthony B. Brennan, Michael P. Zamora and Rodrigo L. Orefice It is certified that error appears in the above-identified patent and that said Letters Patent is hereby corrected as shown below:

<u>Column 18, cont'd.</u>
Line 52, "is an integer" should read -- x is an integer --.

<u>Column 19,</u>
Line 11, "claim 59" should read -- claim 58 --.
Line 14, "claim 59" should read -- claim 1 --.

<u>Column 20,</u>
Line 60, "claim 88" should read -- claim 1, 30, or 58 --.

Signed and Sealed this

Seventh Day of January, 2003

JAMES E. ROGAN
*Director of the United States Patent and Trademark Office*